(12) United States Patent
Fortin

(10) Patent No.: US 6,245,211 B1
(45) Date of Patent: Jun. 12, 2001

(54) PROCESS FOR OBTAINING TITANIUM OR OTHER METALS USING SHUTTLE ALLOYS

(76) Inventor: Claude Fortin, 5, chemin du Loup, F-69400, Limas (FR)

(*) Notice: Subject to any disclaimer, the term of this patent is extended or adjusted under 35 U.S.C. 154(b) by 0 days.

(21) Appl. No.: 09/269,645

(22) PCT Filed: Sep. 23, 1997

(86) PCT No.: PCT/AU97/00624

§ 371 Date: Jun. 23, 1999

§ 102(e) Date: Jun. 23, 1999

(87) PCT Pub. No.: WO98/14622

PCT Pub. Date: Apr. 9, 1998

(30) Foreign Application Priority Data

Sep. 30, 1996 (FR) .................................................. 96 12794
Oct. 7, 1996 (AU) .................................................. PO2763

(51) Int. Cl.[7] .................. C25C 1/24; C25C 1/00; C22B 26/00; C22B 34/10; C22B 34/30

(52) U.S. Cl. .................. 205/557; 205/560; 75/589; 75/594; 75/614; 75/615; 75/623

(58) Field of Search .................. 75/615, 623, 613, 75/614, 589, 594; 420/590; 205/560, 557

(56) References Cited

U.S. PATENT DOCUMENTS 4,735,654 * 4/1988 Cochran et al. .................. 75/594 X
5,141,723 * 8/1992 Miller et al. .................. 205/560 X
5,427,657 * 6/1995 Sharma .................. 205/560

* cited by examiner

*Primary Examiner*—Donald R. Valentine
(74) *Attorney, Agent, or Firm*—Jenkens & Gilchrist, P.C.

(57) ABSTRACT

The present invention relates to a process for obtaining metals from oxides using shuttle alloys, particularly titanium metal from titanium dioxide in the form of illmenite rutile. The process can be adapted to obtain elemental metal or alloys of metals such as zirconium, chronium, molybdenum, tungsten, tantalum, lithium, cobalt and zinc. The process of the present invention comprises two stages, a first stage in which a metal oxide is reduced in the presence of primary shuttle material, which forms a shuttle alloy with the reduced metals, and a second stage wherein the reduced metal is separated from the shuttle alloy as a metal or alloy. Typically the primary shuttle material comprises bismuth or antimony or a mixture of the two and optionally lead. The reduction reaction may be carried out by chemical means or electrochemical means or by a combination of the two. The process permits the two stages to be linked and the process run continuously such that energy recovered from the second stage may be transferred to the first stage and used to drive the reduction of the metal oxide or other reactions, such as the decarbonization of calcium carbonate used as a melting agent. The addition of material such as silica to the process, may facilitate recovery of by-products such as aluminous cements.

44 Claims, 9 Drawing Sheets

PROCESS FOR OBTAINING TITANIUM OR OTHER METALS USING SHUTTLE ALLOYS

Figure 1:
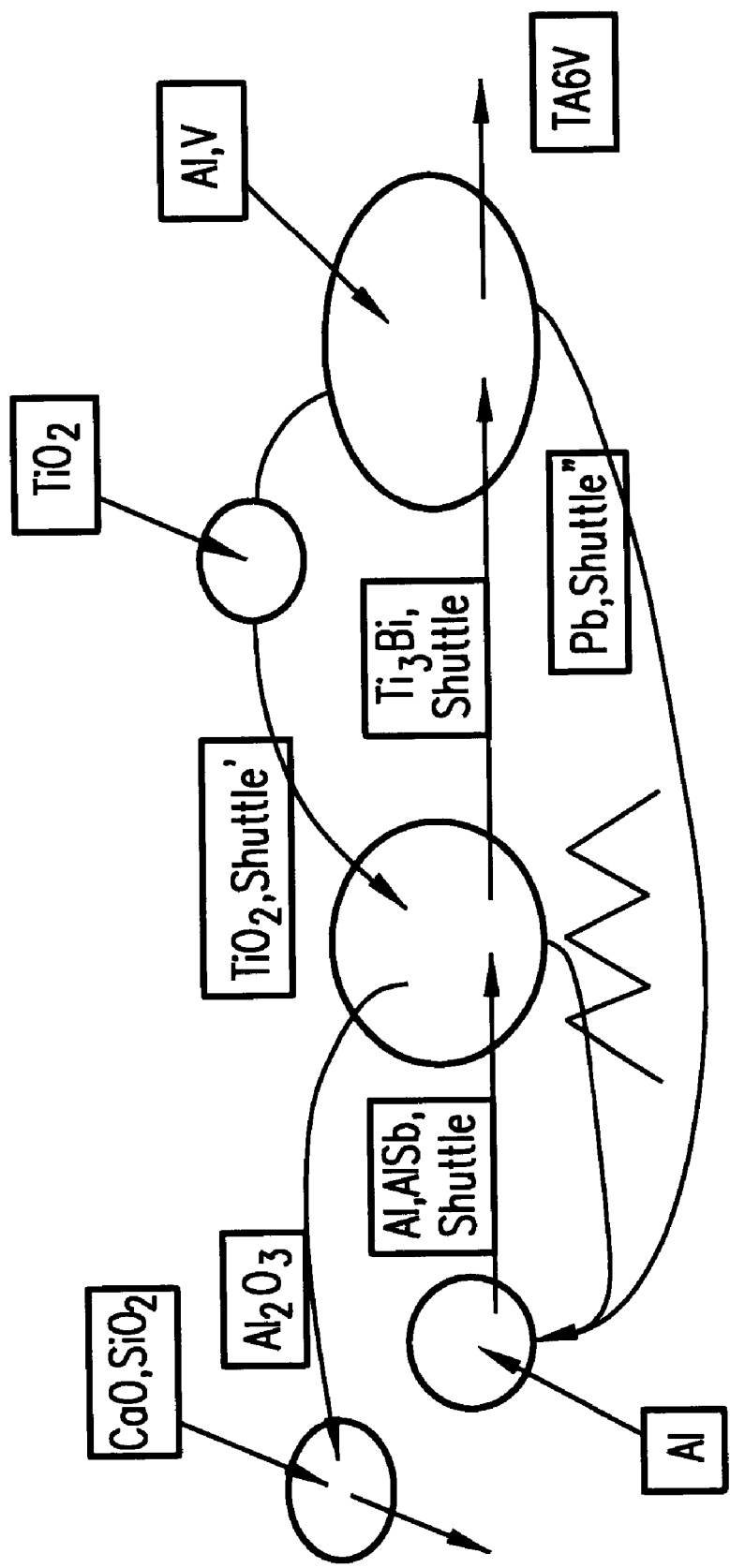

The present invention relates to an improved process for obtaining metals like titanium, zironium, chromium, molybdenum, tungsten, cobalt and tantalum from metal oxides using shuttle alloys. More particularly the present invention relates to a process for obtaining alloys and compounds of metals wherein the metal is very sensitive to oxygen and nitrogen, such as titanium, zirconium, magnesium, tantalum, lithium, beryllium, sodium and potassium by the use of a shuttle alloys.

Although the present invention will be described with particular reference to the isolation of titanium and complexes of titanium in the form of ingots, it is to be noted that the scope of the present invention is not so limited but rather the scope of the present invention is broader so as to include other metals. Furthermore the process of the present invention may be used to provide metals and metal complexes in forms other than ingots and may be used to supply metals or metal complexes in directly to other processes.

There are many different processes used in industry for isolating or purifying metals in their elemental form or in the form of a metal complex. Many industrial processes act directly on metal ore where the relevant metal is present as a metal oxide or a metal oxide complex. For example titanium and zirconium are commonly obtained from ores ouch as rutile, ilmenite and zircon using the Kroll process. In steelworks, ferro-titanium is routinely obtained by direct aluminothermia.

The Kroll process is based on the transformation of titanium or zirconium ore to titanium or zirconium chloride followed by reduction of the metal chloride in a bath of magnesium to create a porous mass of titanium or zirconium which is referred to as a "sponge". The magnesium in evaporated from the sponge, and the titanium or zirconium melted and poured into ingots. Where an alloy is to be cast, the titanium or zirconium from the sponge is combined with the other alloy components during casting. The ingots are often remelted and recast in a further refinement step. Refinement of the sponge must be carried out in a vacuum oven due to the extreme sensitivity of the sponge to oxygen and nitrogen. Furthermore measures must be taken to avoid any contamination of the final finished products.

Aluminothermia is based on reacting powdered aluminium with titanium dioxide, usually derived from ilmenite. In practice this reaction is endothermic and measures must be taken to avoid producing a mere mixture of aluminium and titanium—a mixture which is particularly difficult to separate because aluminium and titanium have similar densities. In order to avoid forming a mere admixture, the titanium ore/melting agent combination and the ferro-aluminium are separately preheated in an electric oven then mixed and puddled to produce a floating slag and ferro-titanium for use by the steelworks.

These processes of the prior art suffer from many drawbacks including the difficulty of handling and processing oxygen and nitrogen sensitive intermediates such sponges, and difficulties in separating individual products of the process. Furthermore the Kroll process, aluminothermia and the like can only be carried out as batch processes, not continuous processes.

It has now been found that many of the disadvantages of the prior art can be overcome by the use of a shuttle alloy (which can also be called a "taxi alloy"). The shuttle material may for example, facilitate reduction of a metal oxide by carrying a reducing agent to the metal oxide and subsequently, form a shuttle alloy which comprises the reduced metal derived from reduction of the metal oxide. In particular the present invention does not require the production of intermediate sponges, but rather uses the continuous production of shuttle alloy comprising metal derived from reduction of metal oxide. Furthermore the reduced metal of the shuttle alloy is far less fragile and less sensitive to oxygen and nitrogen than intermediates such as sponges formed by processes the prior art. Furthermore the formation of a shuttle alloy makes it easier to isolate pure metal at a later step.

The process of the present invention also does not require an intermediate ingot refining phase as is common in many of the processes of the prior art. In the present invention, the reduced metal may be separated from the shuttle alloy in the form of a pure metal or alloy, and is sufficiently resistant to oxidation that it can be stored, or alternatively used to directly and continuously supply different types of seconds production processes such as the production of bars, tubes or sheets. The process of the present invention does not consume large amounts of chemicals such as chlorine or hydrochloric acid and the components of the shuttle alloy may be recycled. The process of the present invention is also far more economical and more environmentally friendly than the processes of the prior art.

The present invention therefore provides a process for producing a metal or alloy from metal oxide characterised by a first stage in which a metal oxide is reduced in the presence of a primary shuttle material, which forms a shuttle alloy with the reduced metal, and a second stage wherein the reduced metal is separated from the shuttle alloy as a pure metal or alloy.

As stated above, the first stage of the process comprises reduction of a metal oxide in the presence of primary shuttle material which forms a shuttle alloy with the reduced metal. The reduced metal may be in the form of metal or metal oxide or the like and may dissolve in, react with, or otherwise combine with the primary shuttle material to form the shuttle alloy. In the second stage of the process, the reduced metal may be removed from the shuttle alloy by physical means such as vacuum distillation or magnetic separation or by chemical reaction. The reduced metal removed from the shuttle alloy may be in the form of pure metal, or in the form of an alloy/bimetallic compound. Where the reduced metal is removed from the shuttle alloy by physical means, it may be cast into ingots or supplied directly to downstream processes. Where the reduced metal is in the form of an alloy, an ingot of the alloy may be further processed to produce the reduced metal in pure form.

Typically the metal oxide reactant in the first stage in a simple metal oxide such as $TiO_2$, $Li_2O$, $MgO$, $CaO$, $CoO$, $Ta_2O_5$ or $ZrO_2$, or a complex metal oxide such as $FeTiO_3$, $FeCr_2O_4$, $MnCr_2O_4$, $FeWO_4$ or $ZrSiO_4$. The metal oxide may be in the form of, or in combination with an ore such as rutile, illmenite, chromite, wolframite, zircon and the like.

Typically the process of the present invention will be used for the production of pure metal such as pure titanium, but it will be apparent to the person skilled in the relevant technology that the process can be used for production of many metals other than titanium. Typical the process of the present application is used to produce refined metal or metal alloy of titanium, zirconium, lithium, magnesium, chromium, molybdenum, tungsten or cobalt.

Typically the primary shuttle material comprises bismuth or antimony or a combination of the two. The bismuth or antimony be in the form of elemental metal, metal compounds or as mixtures of elemental metal and metal compounds. Optionally the primary shuttle material also comprises elemental lead or a lead compound, which may remain neutral but form eutectics with the bismuth and antimony. Lead has a greater density than antimony or bismuth, and provides much greater vapour tension, which is advantageous if in the second stage of the process, the shuttle alloy is separated from the reduced metal by heat and/or vacuum treatment. The primary shuttle material may also comprise shuttle alloy recycled from the second stage of the process.

Typically, in the first stage of the process the primary shuttle material is in the liquid state.

Typically the primary shuttle material comprises bismuth and antimony in a molar ratio of between 3:1 and 1:3. Typically, where the primary shuttle material comprises lead, the molar ratio of bismuth to lead is between 3:1 and 1:3. More typically the molar ratio of bismuth, antimony and lead is between 2:1:3 and 3:1:1. For example, a ratio of 3:1:2 is sufficient for the transfer of approximately one or two moles of titanium and titanium dioxide.

Typically the primary shuttle material is not consumed by the process but is recycled and reused in the process. Any losses during the process will be very small and can be compensated by adding a little bismuth (or antimony or lead) or compounds thereof to metal oxide introduced to the first stage of the process.

Typically, a reducing agent participates in the reduction of the metal oxide in the first stage of the process. Typically the reducing agent is chosen from the group comprising aluminium, lithium, magnesium, calcium, silica, sodium, potassium and compounds thereof. Aluminium is particularly preferred due to its cost and in one embodiment of the process, carbon or a compound of carbon can be used.

The reducing agent may be added to the first stage or it may be formed "ins situ". Furthermore, the reducing agent may be present in the process as a free species, but more typically, some or all of the reducing agent is carried by the primary shuttle material. For example, the reducing agent may be carried by the primary shuttle material as a result of physical or chemical combination or formation of an alloy. Typically where aluminium is to be used as the reducing agent, and the primary shuttle material comprises antimony, bismuth and optionally lead, the aluminium will react with the primary shuttle material, such that the shuttle alloy carries the aluminium in the form of Al or AlSb.

Alternatively the reduction reaction in the first stage of the process can be carried out by electrochemical means. For example in the first stage of the process, reduction may be carried out within an electric field such as that produced in an electrochemical cell comprising a cathode and an anode. Typically the electrochemical cell comprises an anode of solid graphite. Typically the cathode of the electrochemical cell is a metal such as tungsten. The primary shuttle material may act as an anode or as a cathode depending on the type of material used for the other electrode.

Furthermore, the reduction reaction in the first stage of the process can be carried out by using a combination of electrochemical means and reducing agent or by using the electrochemical means to produce the reducing agent "in situ". For example $LiO_2$ may be introduced into an electro-chemical call where it reacts at a carbon anode to form lithium carbonate. This anodic carbonation reaction can concomitantly promote or drive the reduction of a metal oxide in the first stage of the process of the present invention.

The present invention is particularly flexible because a shuttle alloy formed in one reaction may be able to be used as the reducing agent in the first stage of a quite separate reaction for reduction of a different metal oxide. For example the $Li_3Bi$, $Li_3Sb$/shuttle alloy formed from $Li_2O$ can be used in a separate reaction for the reduction of CaO. Furthermore a shuttle alloy formed on reduction of MgO can be used in a separate reaction as a reducing agent for $Ta_2O_5$.

When the metal oxide is reduced in the first stage of the process and a shuttle alloy forms, the reduced metal may be present in the shuttle alloy in the form of a simple metal or may combine with some of the primary shuttle material to form a bimetallic compound. Typically, where the metal oxide is $Li_2O$ or MgO, the lithium or magnesium forms a compound with the bismuth and antimony of the primary shuttle material. Where tho metal oxide is CaO, a compound of calcium and lead may form. Where the metal oxide is titanium, a compound of titanium and bismuth may form. Where the metal oxide is chromium, a compound of chromium and antimony may form. Where the metal oxide is CoO, a compound of cobalt and antimony may form. The reduced metal may also be in a form which dissolves in shuttle alloy formed. For exile, an intermediate such an $Ti_3Bi$ will tend to dissolve in a shuttle alloy comprising bismuth, antimony and lead.

In one embodiment, the process of the present invention is used for the continuous production of titanium metal or a titanium alloy. Typically in the first stage of the process, reduced titanium in produced by aluminothermia and the shuttle alloy formed comprises $Ti_3Bi$. In the second stage of the process, the $Ti_3Bi$, is removed from the shuttle alloy, and the $Ti_3Bi$ is dissociated into constituent titanium and bismuth. The titanium may be fed continuously to an ingot casting process or to a process for the formation of titanium semi-products. Where an alloy of titanium is required, other metals such as vanadium and tin are added to the separated titanium. This would for example, be suitable for production of various titanium alloys such as the alloy known as TA6V.

FIG. 1 depicts the titanium refining process of the above embodiment and clearly shows the shuttle recycling loop which can be utilised in the process of the present invention. In the recycling loop the reducing agent, Al is introduced to the primary shuttle material and is carried by the primary shuttle material in the form of Al and AlSb. The Al and AlSb participate in the reduction of $TiO_2$. Reduced titanium in the form of $Ti_3Bi$, forms part of the shuttle alloy. The reducing agent is converted by oxidation to $Al_2O_3$. The $Ti_3Bi$ is removed from the shuttle alloy and dissociated in a vacuum oven to elemental Ti and Bi. The titanium from the dissociation is combined with vanadium metal to form a TA6V alloy. The cycle is completed when the bismuth and separated shuttle alloy are returned to the first stage to be reused as primary shuttle material. The primary shuttle material is again combined with reducing agent and the cycle is then repeated.

Typically, where a recycling loop such as that described above is used, the total quantity of the components of the shuttle alloy and primary shuttle material remains constant. For example, in the loop described above, all the bismuth from the process is either in the form of primary shuttle material, shuttle alloy and/or $Ti_3Bi$ or $Ti_2Bi$.

The process of the present invention may also be made particularly energy efficient by recycling. For example, $Ti_3Bi$ has very low enthalpy and it is relatively easy to dissociate by evaporating off the bismuth in a vacuum oven to leave pure titanium. In a recycling loop, the bismuth vapour may be condensed on the titanium dioxide or rutile being fed into the aluminothermal reaction of the first stage of the process. The titanium dioxide reactant and condensed bismuth are put into solution with primary shuttle material on the way back to a first stage reactor in which the aluminothermal reaction will take place. Thus the evaporation energy is recovered to supply the necessary energy for the aluminotheral reaction. Accordingly, by monitoring the reaction temperature of the first stage of the process, and by controlling supply of bismuth, shuttle alloy, metal oxide, reducing agent, and energy into the aluminothermal reactor, the rate of the process can be controlled and the process can be run continuously.

Depending on the reducing agent used, the initial reduction reaction may lead to formation of unwanted slag which can be removed by addition of a melting agent. Typically the melting agent is a low melting point oxide. In particular, when aluminium is used as a reducing agent, alumina slag is formed by the aluminothermia reaction in the first stage of the process. For example calcium oxide and silica can be used as a melting agent to remove the alumina slag, in which case the slag can be recovered as an aluminous cement and the energy from this reaction can be returned to be used to promote decarbonisation of calcium carbonate to form calcium oxide which is used as a melting agent.

Typically the process of titanium or titanium alloy production is carried out using a primary shuttle material comprising bismuth, antimony and optionally lead and aluminium as reducing agent. Without wishing to be bound by theory it is believed that in the first stage of the process, the aluminothermal reaction with titanium dioxide, leads to formation of Al and AlSb in the shuttle alloy. The formation of these compounds promotes the aluminothermal reduction such that the titanium dioxide is converted to $Ti_3Bi$ and the Al and AlSb are concomitantly converted to $Al_2O_3$ according to the following reaction;

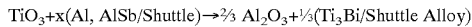
$TiO_3+x(Al, AlSb/Shuttle) \rightarrow \frac{2}{3} Al_2O_3+\frac{1}{3}(Ti_3Bi/Shuttle Alloy)$ The $Ti_3Bi$ compound is readily soluble in bismuth alloys and has a density and melting point which differs significantly from the density and melting point of the constituents of the shuttle alloy. The $Ti_3Bi$ also has physical and chemical characteristics which distinguish it from oxides (such as alumina oxide) which may be formed as a by-product resulting from reaction by the reducing agents used in the reduction of the titanium. Accordingly the $Ti_3Bi$ can be readily concentrated or extracted from solution with the shuttle alloy. Typically the shuttle alloy and $Ti_3Bi$ are in a bath which is rotated, producing centrifugal effect which facilitates removal of the $Ti_3Bi$ from the shuttle alloy. The $Ti_3Bi$ removed may be continuously supplied to a downstream process or facility for drawing, casting, stretching rolling and soforth. Alternatively, the $Ti_3Bi$ removed from the shuttle alloy may be cast into ingots and readily transported or stored. The ingots may be used later in a process or treated to separate pure titanium metal from the bismuth.

The invention will be further described with reference to the following non-limiting examples:

EXAMPLE 1
Production of Cobalt

In this example the shuttle alloy was used to produce cobalt from CoO. The primary shuttle material comprised antimony, bismuth and lead and an aluminium compound was used as a reducing agent. In the first stage of the process, Al and AlSb formed with the primary shuttle material. The Al and AlSb acted as reducing agents to reduce the CoO with concomitant formation of a shuttle alloy comprising $CoSb_3$. This reaction can be depicted as follows;

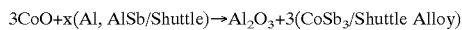
$3CoO+x(Al, AlSb/Shuttle) \rightarrow Al_2O_3+3(CoSb_3/Shuttle Alloy)$ In the second stage of the process the $CoSb_3$ was separated from the shuttle alloy and distilled using a vacuum oven to separate the cobalt and antimony. The antimony vapour was condensed back onto the shuttle alloy so that there was no nett loss of antimony from the process.

EXAMPLE 2
Production of Chromium Alloys from Chromite

Figure 2:
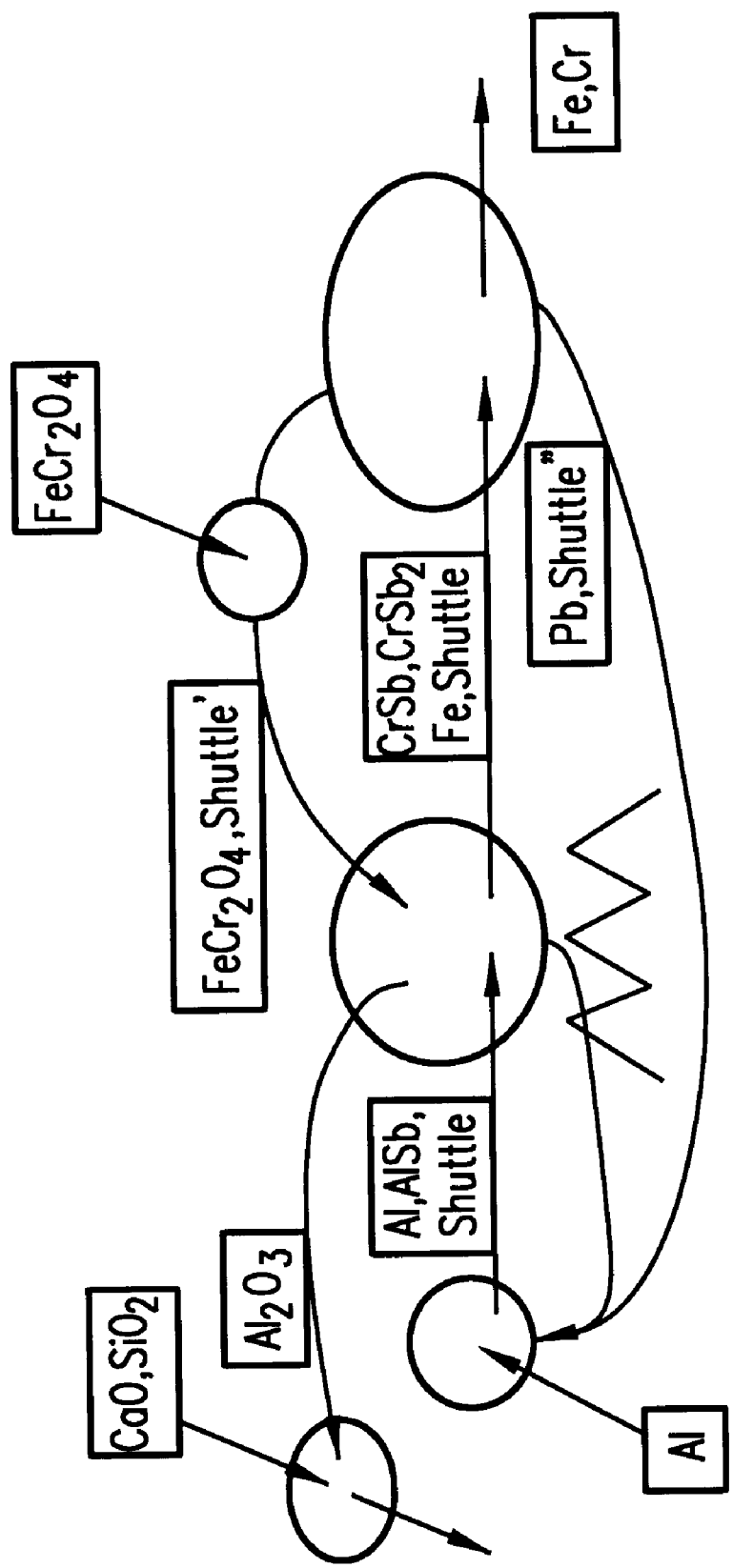

The process of the following exile is depicted schematically in FIG. 2.

In this example the process of the present invention was used to treat chromite. The primary shuttle material was comprised of antimony, bismuth and lead, the proportion of antimony being greater than that used in the production of, for example, titanium or titanium alloy as outlined above in the description. The reducing agent was aluminium, but other reducing agents could have been used. The shuttle alloy formed comprised (Fe, CrSb, $CrSb_2$ /Shuttle Alloy) or (Mn, CrSb, $CrSb_2$,/Shuttle Alloy) depending on the particular chromite or chromite ore used. These reactions can be depicted as follows;

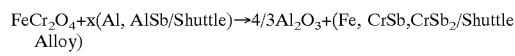
$FeCr_2O_4+x(Al, AlSb/Shuttle) \rightarrow 4/3Al_2O_3+(Fe, CrSb,CrSb_2/Shuttle Alloy)$ or,

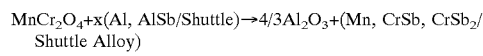
$MnCr_2O_4+x(Al, AlSb/Shuttle) \rightarrow 4/3Al_2O_3+(Mn, CrSb, CrSb_2/Shuttle Alloy)$ The Fe, Mn, CrSb and $CrSb_2$ were removed from the shuttle alloy in a vacuum oven to produce alloys useful for metallurgical reactions. The shuttle alloy was returned to the process in combination with the chromite a aluminium used to feed the first stage.

EXAMPLE 3
Production of Tungsten Powder from Wolframite

Figure 3:
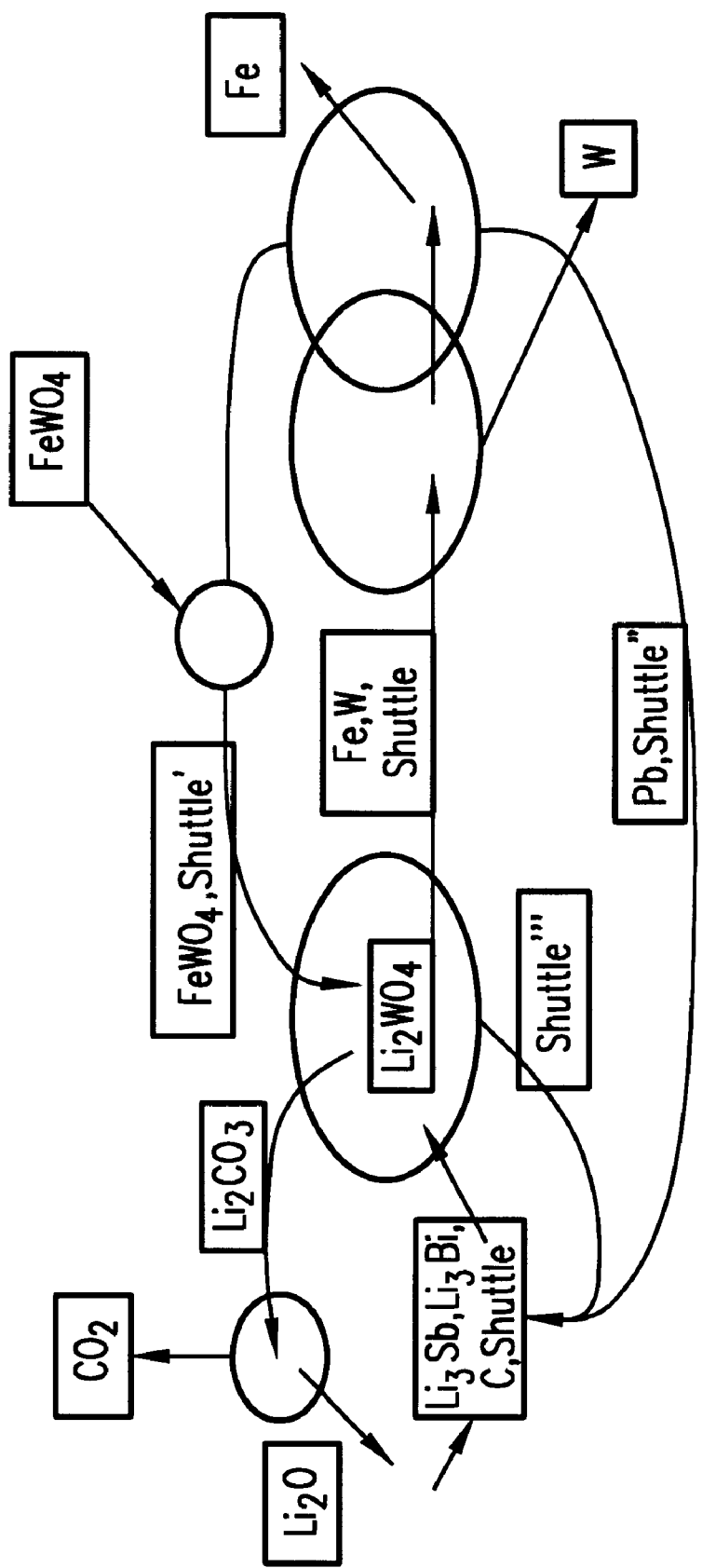

The process of the following example is depicted schematically in FIG. 3.

In this example the process of the present invention was used to treat wolframite ($FeWO_4$). The primary shuttle material comprised antimony, bismuth and lead. The reducing agent a lithium and in another embodiment, a compound of lithium with shuttle alloy and carbon. The reactions can be depicted as follows:

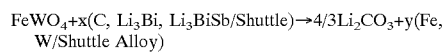
$FeWO_4+x(C, Li_3Bi, Li_3BiSb/Shuttle) \rightarrow 4/3Li_2CO_3+y(Fe, W/Shuttle Alloy)$ In the first stage there was formation of a shuttle alloy comprising the reduced metals (Fe and W) whilst in the second stage the reduced metals were removed from suspension in the shuttle alloy. The shuttle alloy has a very low melting point which facilitated the removal of elemental Fe by magnetic methods, followed by separation of the tungsten by using differential density techniques.

EXAMPLE 4
Production of Titanium Alloys from Ilmenite

Figure 4:
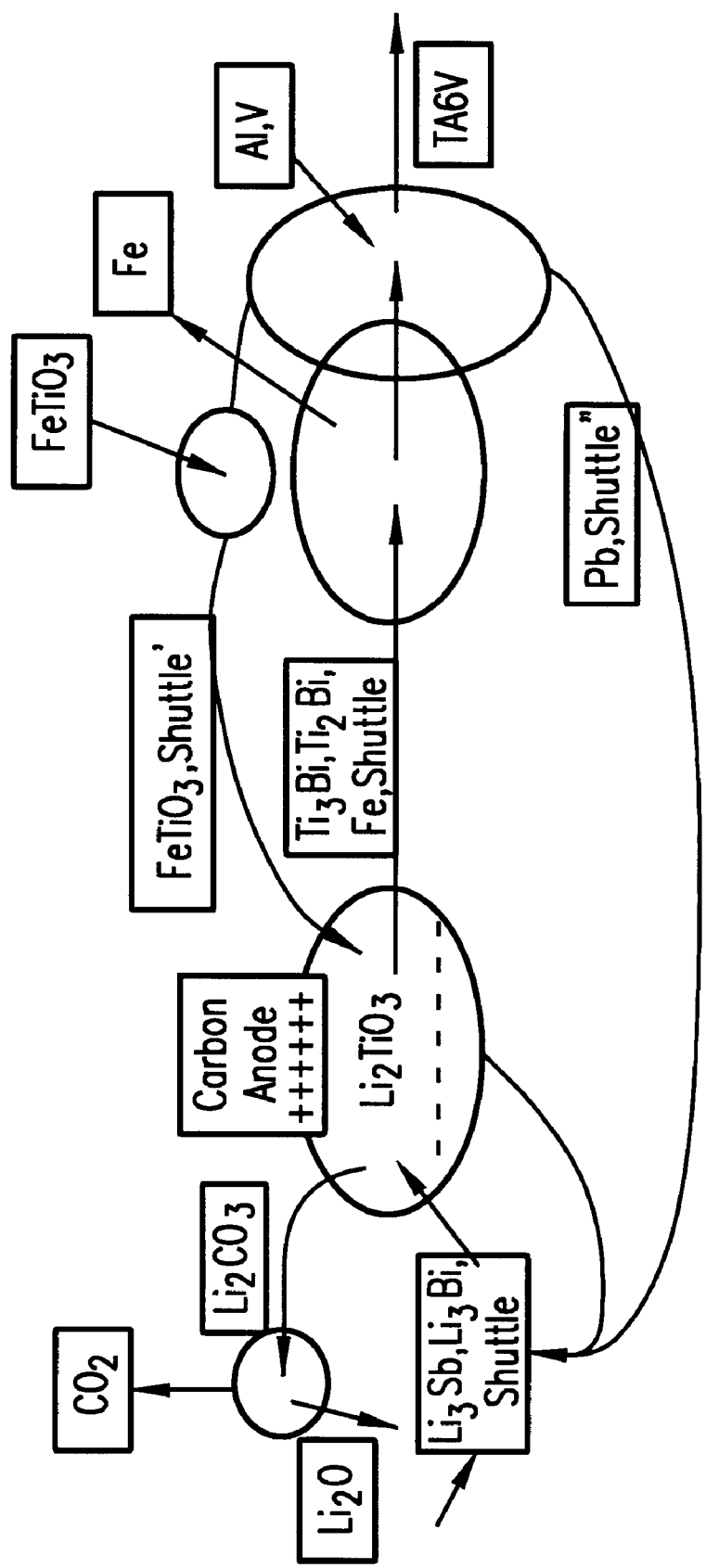

The process the following example is depicted schematically in FIG. 4.

In this example, the process of the present invention was used to treat ilmenite. The primary shuttle material was comprised of antimony, bismuth and lead. The reducing agent comprised a compound of lithium with shuttle alloy however lithium could have been used as an alternative. In this example a specific oven was used, which was fitted at the top with a consumable graphite electrode, while beneath this, the bath of shuttle material comprised the cathode. Due to its low density, lithium oxide introduced into the bath floated and contact the anode where it reacted to form the carbonate. The lithium carbonate so formed promoted dissociation of ilmenite reactant to two oxides ($Fe_2O_3$ and $Ti_2O_3$) and caused a partial reduction of the iron oxide. In the bath, the oxide of titanium and lithium formed a solution which was easily reduced by the lithium compound and the titanium was absorbed into the shuttle alloy. These reactions can be depicted as follows;

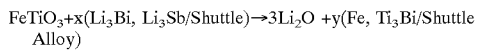

In the second step, due to the low melting point of the shuttle alloy, the Fe element was readily separated from the melt by magnetic methods. The separation of lead was facilitated by the relatively large density differential between the lead and other components present. Finally, a vacuum oven was used to remove $Ti_3Bi$ as an alloy from the shuttle alloy.

Example 5
Production of Zirconium from Zircon or Baddeleyite

Figure 5:
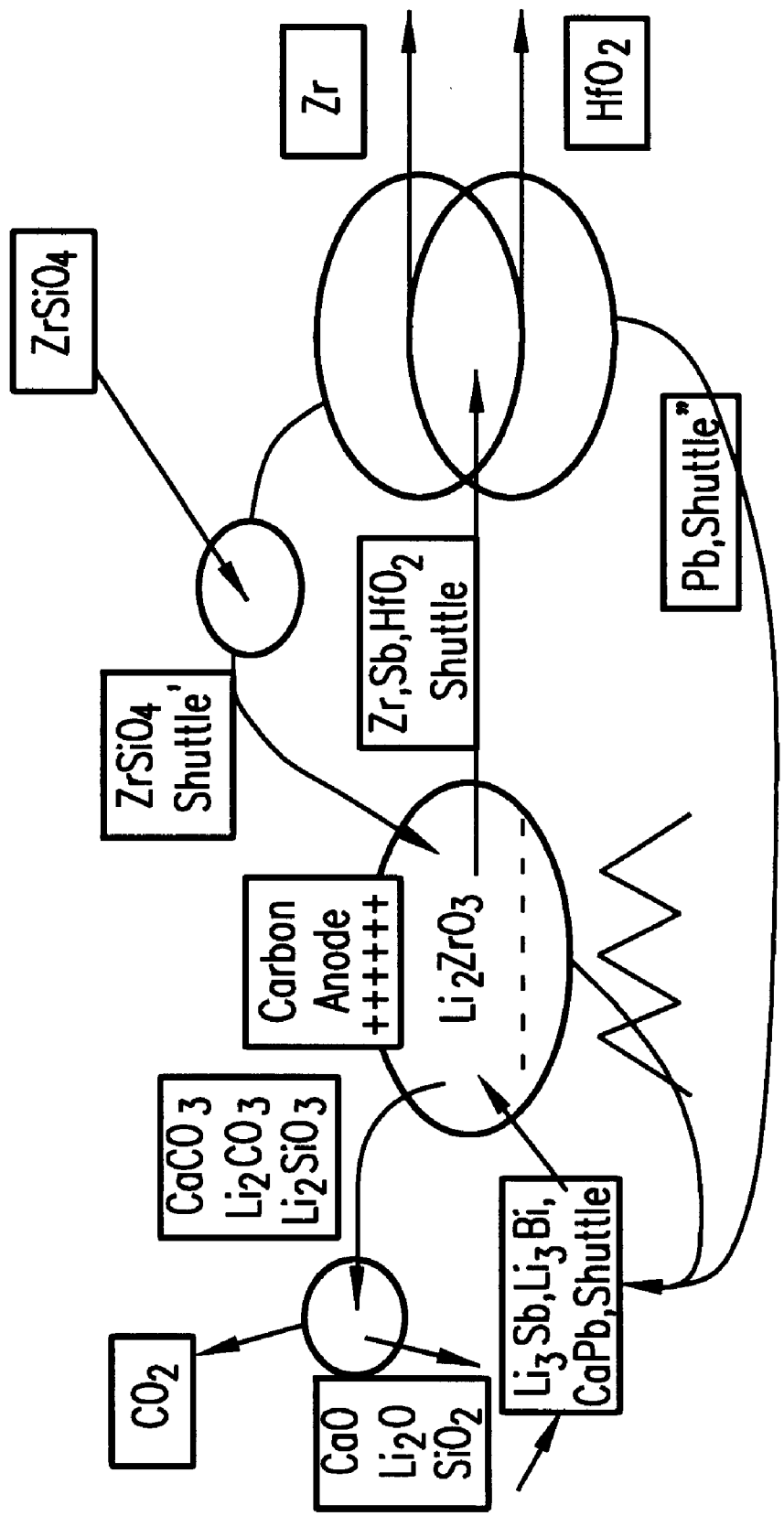

The process of the following example is depicted schematically in FIG. 5.

In this example the process of the present invention was used to produce pure zirconium, free of hafnium. The shuttle alloy comprised antimony, bismuth and lead and several blended compounds thereof. In the first stage of the process, an oven similar to that described in Example 4 was used. The reactions can be depicted as follows;

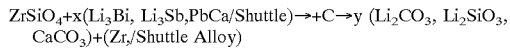

In the second stage of the process, elemental zirconium was removed from the shuttle alloy by use of a vacuum oven.

The embodiment of the process of the present invention as described in Example 5 is particularly advantageous in that it allows the production of zirconium free from hafnium. The separation of zirconium and hafnium has hitherto proved a major difficulty. In the process of the present invention, precise monitoring of the process temperature allows reduction of zirconium without any reduction of hafnium by virtue of the fact that the enthalpy of the formation of hafnium oxide is much higher than the enthalpy of formation of zirconium oxide. FIG. 5 clearly shows the shuttle material recycling loop which can be utilised in the process of the present invention.

EXAMPLE 6
Production of Lithium or Lithium/Magnesium/Calcium

Figure 6:
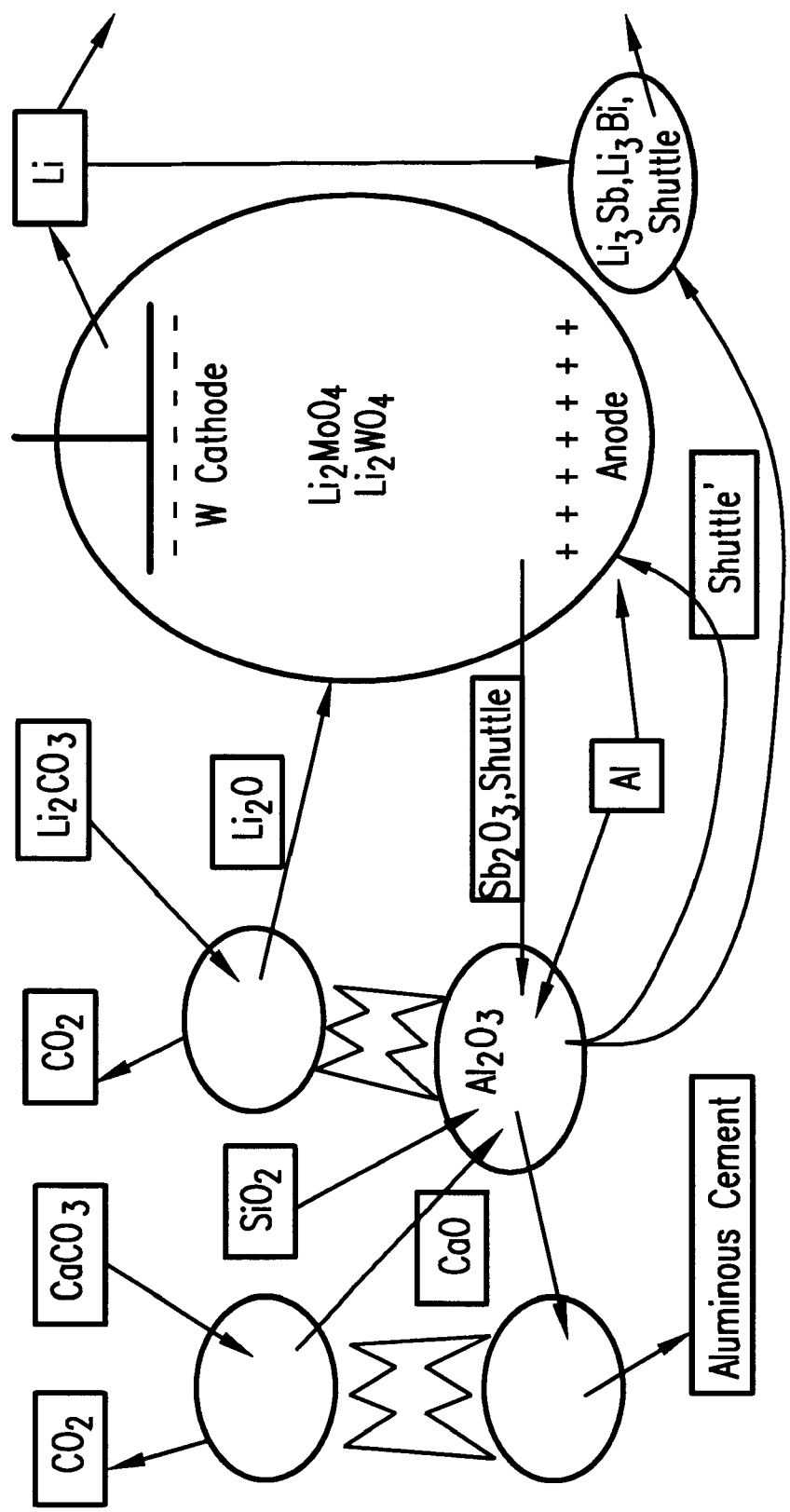

The process of the following example is depicted schematically in FIG. 6.

In this example the shuttle alloy is used to transport oxygen from a lithium reduction call. In this example the bath of primary shuttle material acts as the anode whereas the top of the reaction cell acts as the cathode. The cathode comprised tungsten and the bath of primary shuttle material included a mixture of $Li_2WO_4$ or $Li_2MoO_4$ (although a bath comprising of only one of these oxides could have alternatively been used).

The lithium oxide accumulated at the surface of the bath and dissociated on the tungsten cathode, whereas at the bottom of the bath, the operating temperature was sufficiently high that the antimony oxide was transformed to liquid.

The antimony oxide and part of the shuttle alloy was steadily withdrawn to a reduction oven for reduction by alumina. For this aluminothermic reaction of antimony, the aluminium reductant was introduced into the shuttle alloy in order to best control this exothermic reduction. The antimony in combination with the shuttle alloy was recycled to the anode of the cell with some of the aluminium before causing a partial "in situ" reduction of the antimony oxide in the bath by the anode. The alumina formed was removed with the antimony oxide.

In this type of reaction, optimally the heat released by the aluminotherma reaction can contribute to the decarbonisation of lithium carbonate to form lithium oxide to feed the process. Again, most optimally, the alumina formed is supplemented with the proportions of silica and lime necessary to form a "slag" having the composition of an "aluminous cement". Before the slag becomes cool, part of the heat released can be contributed to the decarbonation of $CaCO_3$ to $CaO$.

Small proportions of magnesia (MgO) or lime (CaO) can be added to the lithium oxide to produce an alloy of lithium/magnesium or lithium/calcium.

EXAMPLE 7
Production of Zinc

Figure 7:
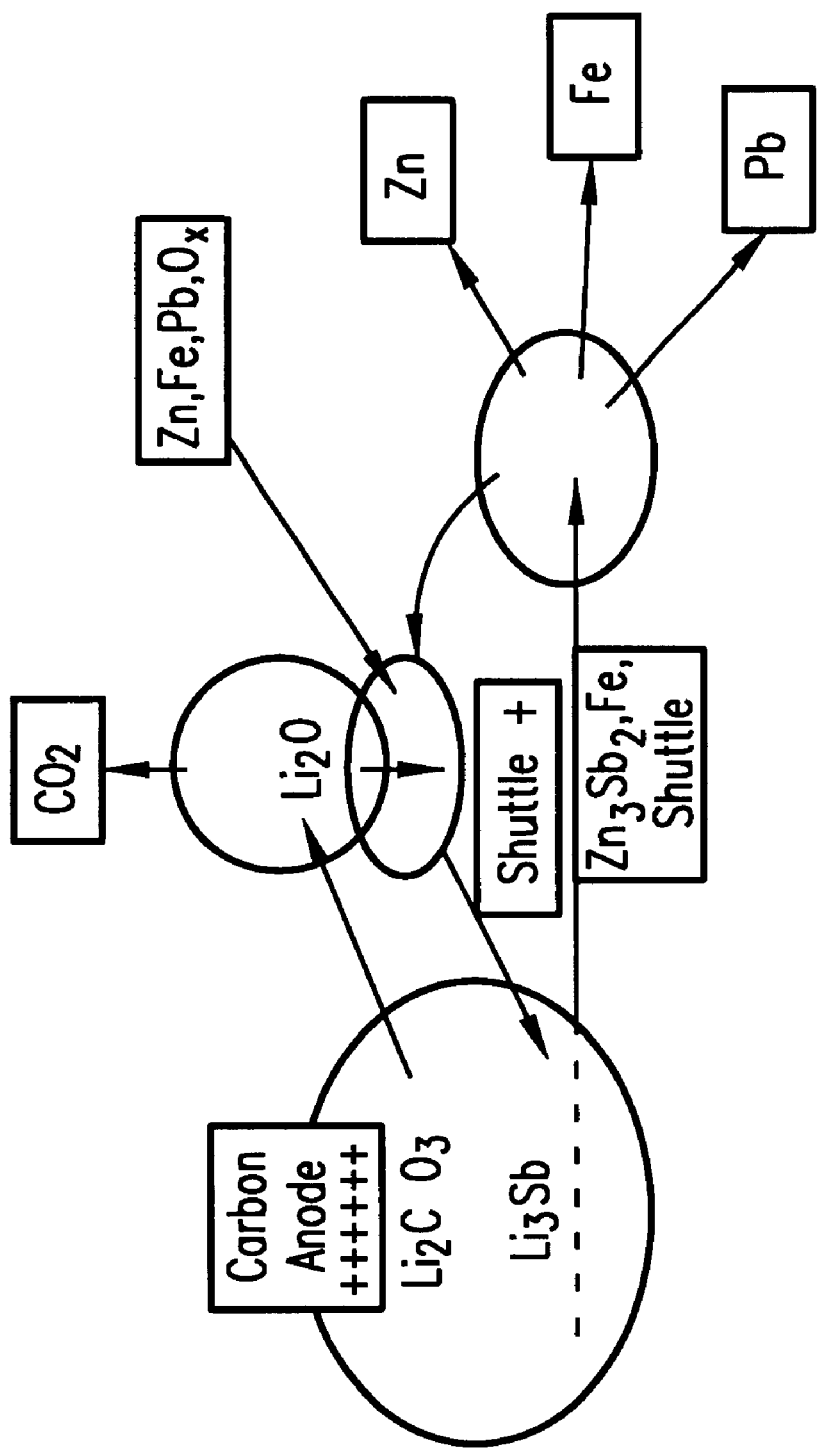
Figure 8:
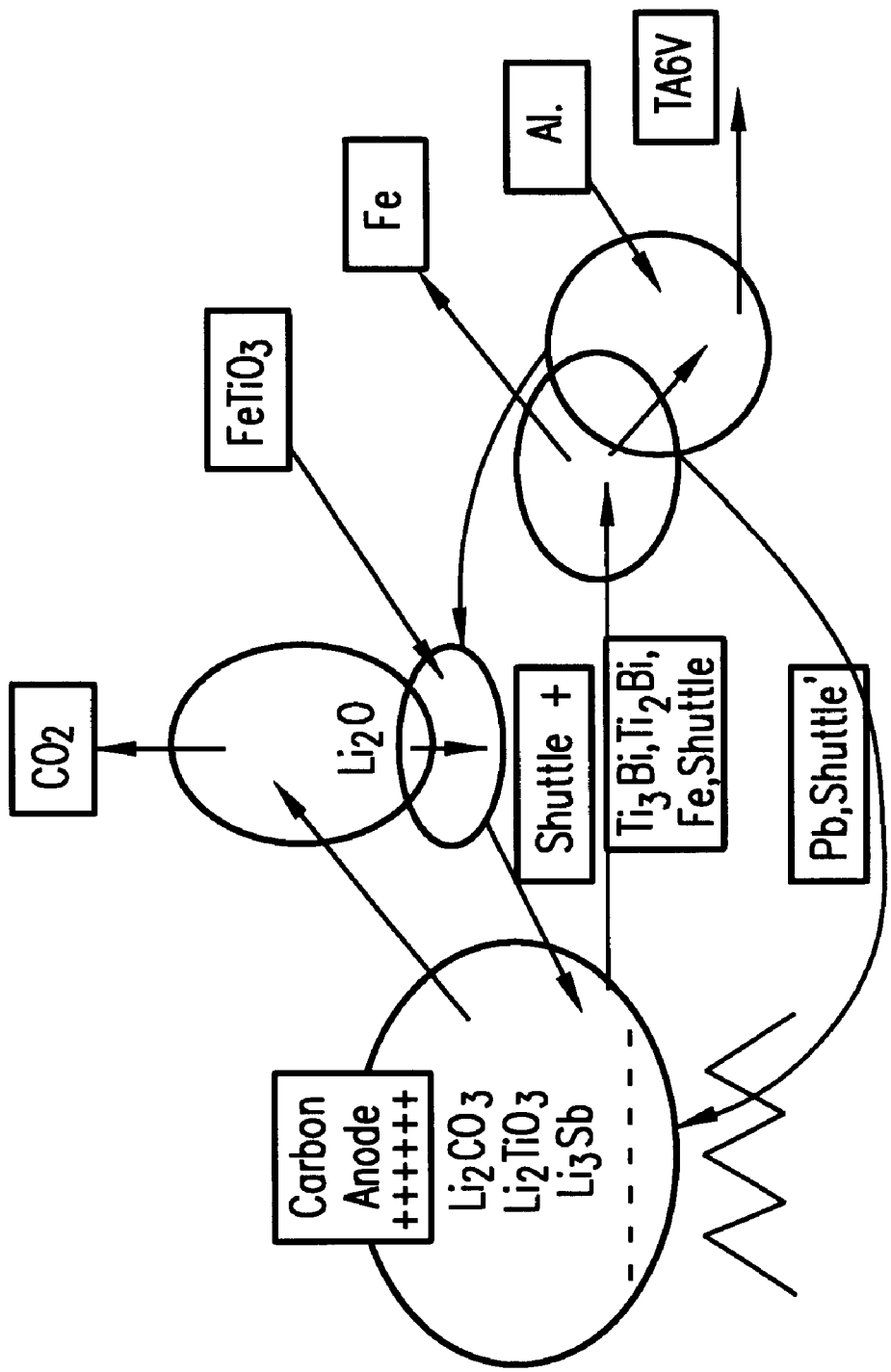

The process of the following example is depicted schematically in FIG. 7.

Certain zinc bearing minerals have high proportions of iron and lead which are advantageous for the process of the present invention, but which pose problems in processes of the prior art. In this example the primary shuttle material comprising compounds of zinc, iron or lead and was combined with lithium oxide in the form of a cathodic bath. The anodic carbonisation enables the reduction of lead, iron and zinc. In the second stage of the process the shuttle alloy comprising the compounds of zinc, iron or lead were transported to a vacuum distillation oven where the zinc and iron/lead were separated.

EXAMPLE 8
Production of Titanium

Example 4 (and corresponding FIG. 4) describe one embodiment of the process of the present invention for the in situ reduction of titanium oxide using lithium oxide as a reducing agent. In the present example, the primary shuttle material was combined with lithium oxide in the form of a cathodic bath. The anodic carbonisation enables the reduction of titanium oxide. In the second stage of the process the shuttle alloy comprising $Ti_3Bi$ and $Ti_2Bi$ was transported to a vacuum distillation oven where the titanium compounds were separated from the shuttle alloy.

Figure 10:
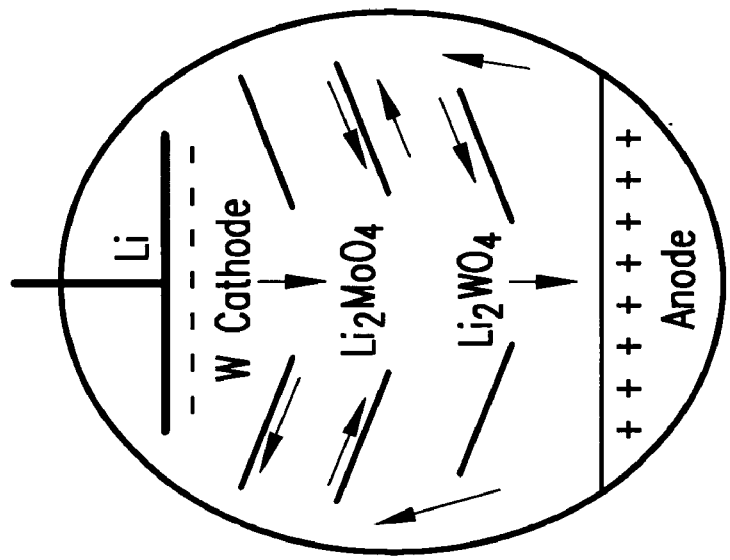
Figure 9:
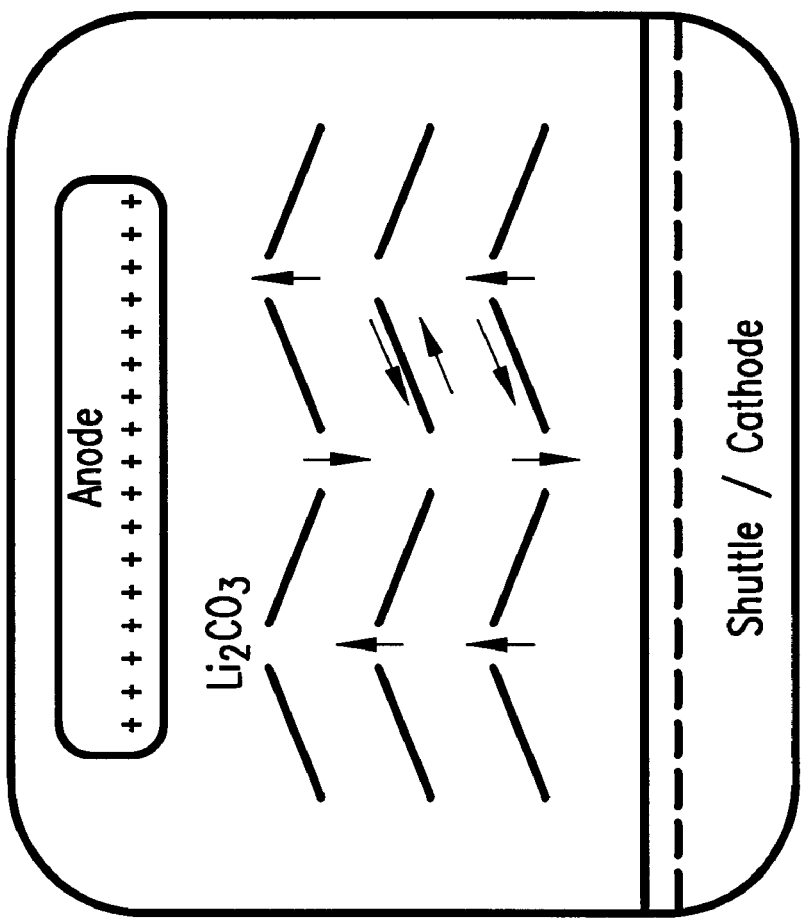

In the present example, for improved cell efficiency, intermediate electrodes were used between the anodic bath and the cathode. (See FIGS. 9 & 10). To promote reaction lithium compounds or other reducing agents, the surfaces of the intermediate electrodes may be tapering/conical or multi-faceted or composed of multiple surfaces side by side, such that liquid can flow between, and across the surfaces of the intermediate electrodes.

The described arrangement has been advanced by explanation and many modifications may be made without departing from the spirit and scope of the invention which includes every novel feature and novel combination of features disclosed herein. Those skilled in the art will appreciate that the invention described herein is susceptible to variations and modifications other than those specifically described. It in understood that the invention includes all such variations and modifications which fall within the spirit and scope of the invention.

What is claimed is:

1. A process for producing a metal or alloy from an oxide chosen from main group metal oxides including alkaline earth and alkali metal-oxides comprising a first stage in which the metal oxide is reduced in the presence of primary shuttle material, which forms a shuttle alloy with the reduced metal, the shuttle alloy protecting the reduced metal from reaction with at least oxygen and nitrogen, and a second stage wherein the reduced metal is separated from the shuttle alloy as a pure metal or an alloy wherein the primary shuttle material and shuttle alloy are free from halide salts.

2. A process according to claim 1 wherein the metal oxide is reduced by chemical means, by electrochemical means or by a combination of chemical and electrochemical means.

3. A process according to claim 1 wherein anodic carbonation is used to promote or drive the reduction of a metal oxide in the first stage of the process.

4. A process according to claim 1 wherein anodic oxidation of the primary shuttle material occurs such that the oxide species of the metal oxide is carried by the primary shuttle material.

5. A process according to claim 1 wherein a reducing agent is used in the reduction of the metal oxide and at least part of the reducing agent is either free and/or carried by the primary shuttle.

6. A process according to claim 5 wherein the metal oxide is reduced by a reducing agent chosen from the group consisting of: aluminum, calcium, lithium, magnesium, sodium, potassium and compounds thereof.

7. A process according to claim 1 wherein the primary shuttle comprises metals chosen from the group consisting of: antimony, bismuth and combinations thereof.

8. A process according to claim 7 wherein the primary shuttle further comprises lead.

9. A process according to claim 1 wherein the process is carried out continuously with shuttle alloy from the second stage of the process being recycled to the first stage.

10. A process according to claim 1 wherein in the second stage of the process, the reduced metal is separated from the shuttle alloy by vacuum distillation, the shuttle alloy is returned to the first stage as a vapor and condensed onto the metal oxide and/or other components for use in the first stage of the process.

11. A process according to claim 1 wherein the reduced metal in the form of a metal or an alloy is supplied to a downstream process.

12. A process according to claim 1 wherein the metal oxide comprises a metal chosen from the group consisting of: zirconium, chromium, molybdenum, magnesium, lithium, beryllium, sodium, calcium, zinc, potassium and combinations thereof.

13. A process according to claim 12 wherein the metal oxide is chosen from the group consisting of: $TiO_2$, $Li_2O$, $MgO$, $CaO$, $Ta_2O_5$, $ZnO$, $ZrO_2$, $FeTiO_3$, $FeCr_2O_4$, $MnCr_2O_4$ and $ZrSiO_4$.

14. A process according to claim 1 wherein the metal oxide is an oxide of titanium and the shuttle alloy comprises $Ti_3Bi$ and/or $Ti_2Bi$.

15. A process according to claim 14 wherein the oxide of titanium is in the form of illmenite or rutile.

16. A process according to claim 1 wherein the metal oxide is lithium oxide and the shuttle alloy comprises $Li_3Bi$ and/or $Li_3Sb$.

17. A process according to claim 1 wherein the metal oxide is an oxide of magnesium and the shuttle alloy comprises $Mg_3Sb_2$ and/or $Mg_2Pb$.

18. A process according to claim 1 wherein the metal oxide is an oxide of chromium and the shuttle alloy comprises $CrSb_3$.

19. A process according to claim 1 wherein the metal oxide is an oxide of zirconium and the shuttle alloy comprises Zr and/or $ZrSi_2$.

20. A process according to claim 19 wherein the oxide of zirconium in present in the form of baddeleyite or zircon and the process conditions are controlled such that the shuttle alloy comprising Zr and/or $ZrSi_2$ is free of hafnium and compounds comprising hafnium.

21. A process according to claim 20 wherein the primary shuttle further comprises lead.

22. A process for producing titanium metal or titanium alloy from an oxide of titanium comprising a first stage in which the oxide of titanium is reduced in the presence of primary shuttle material comprising bismuth, which forms a shuttle alloy with the reduced titanium and protects the reduced titanium from reaction with at least oxygen and nitrogen, and a second stage wherein the reduced titanium is separated from the shuttle alloy as titanium metal or titanium alloy, and wherein the primary shuttle material and shuttle alloy are free from halide salts.

23. A process according to claim 22 wherein the titanium oxide is reduced by chemical means, by electrochemical means or by a combination of chemical and electrochemical means.

24. A process according to claim 22 wherein anodic carbonation is used to promote or drive the reduction of a metal oxide in the first stage of the process.

25. A process according to claim 22 wherein anodic oxidation of the primary shuttle material occurs such that the oxide species of the metal oxide is carried by the primary shuttle material.

26. A process according to claim 22 wherein a reducing agent is used in the reduction of the titanium oxide and at least part of the reducing agent is either free and/or carried by the primary shuttle.

27. A process according to claim 26 wherein the titanium oxide is reduced by a reducing agent chosen from the group consisting of: aluminum, calcium, lithium, magnesium, sodium, potassium and compounds thereof.

28. A process according to claim 22 wherein the primary shuttle comprises metals chosen from the group consisting of: antimony, bismuth and combinations thereof.

29. A process according to claim 22 wherein the process is carried out continuously with shuttle alloy from the second stage of the process being recycled to the first stage.

30. A process according to claim 22 wherein in the second stage of the process, the reduced titanium is separated from the shuttle alloy by vacuum distillation, the shuttle alloy is returned to the first stage as a vapor and condensed onto the titanium oxide and/or other components for use in the first stage of the process.

31. A process according to claim 22 wherein the reduced titanium in the form of a metal or an alloy is supplied to a downstream process.

32. A process according to claim 22 wherein the shuttle alloy comprises $Ti_3Bi$ and/or $Ti_2Bi$.

33. A process according to claim 32 wherein the oxide of titanium is in the form of illmenite or rutile.

34. A process for producing tungsten metal or tungsten alloy from an oxide of tungsten comprising a first stage in which the oxide of tungsten is reduced in the presence of primary shuttle material comprising bismuth, which forms a shuttle alloy with the reduced tungsten and protects the reduced tungsten from reaction with at least oxygen and nitrogen, and a second stage wherein the reduced tungsten is separated from the shuttle alloy as tungsten metal or tungsten alloy, and wherein the primary shuttle material and shuttle alloy are free from halide salts.

35. A process according to claim 34 wherein the tungsten oxide is reduced by chemical means, by electrochemical means or by a combination of chemical and electrochemical means.

36. A process according to claim 34 wherein anodic carbonation is used to promote or drive the reduction of a metal oxide in the first stage of the process.

37. A process according to claim 34 wherein anodic oxidation of the primary shuttle material occurs such that the oxide species of the metal oxide is carried by the primary shuttle material.

38. A process according to claim 34 wherein a reducing agent is used in the reduction of the tungsten oxide and at least part of the reducing agent is either free and/or carried by the primary shuttle.

39. A process according to claim 38 wherein the tungsten oxide is reduced by a reducing agent chosen from the group consisting of: aluminum, calcium, lithium, magnesium, sodium, potassium and compounds thereof.

40. A process according to claim 34 claims wherein the primary shuttle comprises metals chosen from the group consisting of: antimony, bismuth and combinations thereof.

41. A process according to claim 40 wherein the primary shuttle further comprises lead.

42. A process according to claim 34 wherein the process is carried out continuously with shuttle alloy from the second stage of the process being recycled to the first stage.

43. A process according to claim 34 wherein in the second stage of the process, the reduced tungsten is separated from the shuttle alloy by vacuum distillation, the shuttle alloy is returned to the first stage as a vapor and condensed onto the metal oxide and/or other components for use in the first stage of the process.

44. A process according to claim 34 wherein the reduced tungsten in the form of a metal or an alloy is supplied to a downstream process.

* * * * *